United States Patent Office 3,502,669
Patented Mar. 24, 1970

3,502,669
3-AZABICYCLO[3,3,1]NONANE DERIVATIVES
Michio Nakanishi, Oita, Katsuo Arimura, Fukuoka, and Tomio Muro, Oita, Japan, assignors to Yoshitomi Pharmaceutical Industries, Ltd., Osaka, Japan
No Drawing. Filed Sept. 5, 1967, Ser. No. 665,221
Claims priority, application Japan, June 7, 1967, 42/36,723
Int. Cl. C07d 29/26, 51/70, 87/40
U.S. Cl. 260—247.5        47 Claims

ABSTRACT OF THE DISCLOSURE 3-azabicyclo[3,3,1]nonane derivatives of the formula

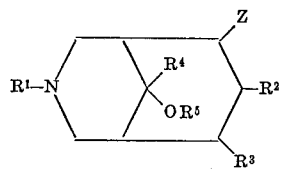

wherein $R^1$ is benzyl, phenethyl or alkyl having 1 to at most 4 carbon atoms, each of $R^2$ and $R^3$ is H or $CH_3$, $R^4$ is H, alkyl having 1 to at most 4 carbon atoms, phenyl, tolyl, methoxyphenyl or trifluoromethylphenyl, $R^5$ is H, alkanoyl having 1 to at most 4 carbon atoms or alkylsulfonyl having 1 to at most 4 carbon atoms, and Z is pyrrolidino, piperidino, morpholino or 4-methyl-1-piperazinyl, are useful as psychoanaleptics and as hypoglycemic agents.

---

This invention relates to novel 3-azabicyclo[3,3,1]nonane derivatives which are useful as psychoanaleptics or as hypoglycemic agents. More particularly, this invention relates to compounds of the formula:

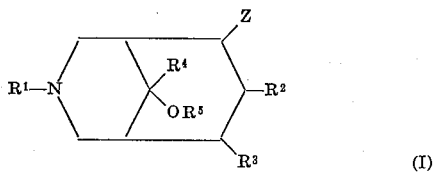

wherein $R^1$ is benzyl, phenethyl or alkyl having 1 to at most 4 carbon atoms, each of $R^2$ and $R^3$ is H or methyl, $R^4$ is H, alkyl having 1 to at most 4 carbon atoms, phenyl, tolyl, methoxyphenyl or trifluoromethylphenyl, $R^5$ is H, alkanoyl having 1 to at most 4 carbon atoms or alkylsulfonyl having 1 to at most 4 carbon atoms, and Z is pyrrolidino, piperidino, morpholino or 4-methyl-1-piperazinyl.

To prepare an unacylated compound (I) wherein each of $R^4$ and $R^5$ is H, the corresponding oxo compound of the formula

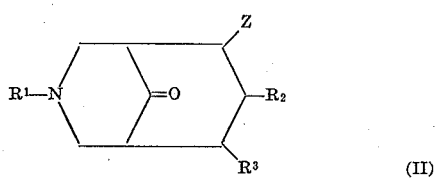

is reduced in a per se known manner for reducing ketones to alcohol, for example, with sodium borohydride in methanol or ethanol at room temperature (about 15° to about 30° C.) for about 2 to 3 hours, with lithium aluminum hydride in diethyl ether or tetrahydrofurane at room temperature or under reflux, with a combination of sodium and an alcohol, with sodium amalgam, or by catalytic reduction over platinum oxide. In order to prepare an unacylated compound (I) wherein $R^4$ is alkyl, phenyl, tolyl, methoxyphenyl or trifluoromethylphenyl and $R^5$ is H, the corresponding oxo compound (II) is reacted with a Grignard reagent of the formula $R^4MgX$ (X being halogen) or with a lithium compound of the formula $$R^4Li$$

by adding a solution of the oxo compound (II) in dry ether or tetrahydrofurane dropwise into a solution of the Grignard reagent or lithium compound in dry ether or tetrahydrofurane, preperably followed by refluxing e.g. for about 2 hours. The products thus produced can be separated in per se conventional manner.

The thus-obtained hydroxy compounds of the formula

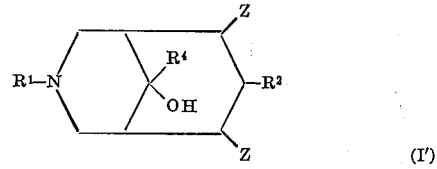

are acylated to prepare the acylated 3-azabicyclo[3,3,1] nonane derivatives (I) ($R^5$=alkanoyl or alkylsulfonyl). The acylating agent is alkanoyl halide (e.g., acetyl, propionyl or butyryl chloride), alkanoic acid anhydride (e.g. acetic, propionic or butyric anhydride), alkanesulfonyl halide (e.g. methanesulfonyl or ethanesulfonyl chloride) or alkanesulfonic acid anhydride (e.g. methanesulfonic anhydride). The acylation is carried out optimally in an organic base such as pyridine, quinoline or triethylamine. A solvent such as benzene, toluene, xylene or chloroform and a deacidifying agent such as sodium carbonate or potassium carbonate can also be used. Heating or refluxing acts to accelerate the reaction.

The 3-azabicyclo[3,3,1]nonane derivatives (I) can form salts with a wide variety of inorganic and organic acids such as hydrochloric, hydrobromic, oxalic, fumaric, and maleic acid, yielding the corresponding pharmaceutically acceptable acid addition salts.

The compounds of the invention, including the said salts, increase spontaneous motility and thus are useful as psychoanaleptics. $LD_{50}$ of the compounds of the present invention in mice (DD strain) is about 300 to about 500 milligrams per kilogram by oral administration. The compounds are safely and effectively administrated orally about 5 to about 50 milligrams per day, in tablet form, for human adult. They also have hypoglycemic activity.

The starting oxo compounds (II) can be prepared by reaction of a tetrahydropyridine compound of the formula

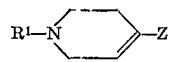

with an acrolein homolog of the formula

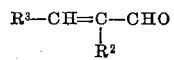

underheating in an inert solvent. The tetrahydropyridine compound can, in its turn, be prepared by reaction of a piperidone of the formula

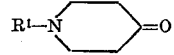

with an amine H–Z, i.e. pyrrolidine, piperidine, morpholine, or 1-methylpiperazine, under heating in an inert solvent. Some examples of preparation of the starting oxo compounds (II) are shown as follows:

Preparation of starting oxo compounds (1) Acrolein (12 grams, 0.2 mole) is added to an ice-cooled solution of 48 grams (0.2 mole) of 1-benzyl-4-pyrrolidino-1,2,3,6-tetrahydropyridine in 150 milliliters of dioxane. The mixture is refluxed for 35 hours, and then cooled. The dioxane is distilled off in vacuo, and 30 milliliters of water are added to the residue. The mixture is warmed at 30–50° C. for 30 minutes and extracted with ethyl acetate. The extract is dried over sodium sulfate. The solvent is distilled off, and the dark reddish brown residue is distilled under reduced pressure in nitrogen atmosphere to give 12 grams of 3-benzyl-9-oxo-6-pyrrolidino-3-azabicyclo[3,3,1]nonane boiling at 175° to 177° C. under 0.7 mm. Hg. Its picrate melts at 112° to 114° C. (from ethanol). Analysis of the picrate:

Calculated for $C_{31}H_{32}H_8O_{15} \cdot H_2O$ (percent): C, 48.07; H, 4.42; N, 14.46. Found (percent): C, 48.42; H, 4.60; N, 14.14.

(2) 1-benzyl - 4 - piperidino-1,2,3,6-tetrahydropyridine (115 grams, 0.45 mole) and acrolein (25 grams, 0.45 mole) in dioxane (230 milliliters) treated similarly as in (1) yield 3-benzyl-9-oxo-6-piperidino-3-azabicyclo-[3,3,1]nonane (51 grams) boiling at 170° to 173° C./0.4 mm. Hg. Its di(hydrogenfumarate) melts at 168° to 169° C. (from acetone-ethanol).

(3) 1-benzyl-4-pyrrolidino-1,2,3,6 - tetrahydropyridine (19 grams, 0.08 mole) and crotonaldehyde (5.5 grams, 0.08 mole) in dioxane (100 milliliters) treated similarly as in (1) yield 3-benzyl-8-methyl-9-oxo-6-pyrrolidino-3-azabicyclo[3,3,1]nonane (8.6 grams) boiling at 184° to 186° C./0.1 mm. Hg.

(4) A mixture of 20 grams (0.11 mole) of 1-benzyl-4-piperidone, 20 grams (0.25 mole) of 1-methylpiperazine and 200 milliliters of toluene is refluxed for 10 hours in a vessel provided with a water-removing device. Then the toluene is distilled off in nitrogen atmosphere under reduced pressure. To the remaining 1-benzyl-4-(4-methyl-1-piperazinyl) - 1,2,3,6 - tetrahydropyridine (28 grams), there are added 6.5 grams (0.12 mole) of acrolein and 100 milliliters of dioxane, and the mixture treated as in (1) to give 18 grams of 3-benzyl-6-(4-methyl-1-piperazinyl)-9-oxo-3-azabicyclo[3,3,1]nonane boiling at 192° to 195° C./0.15 mm. Hg.

(5) To a benzene solution of 1-benzyl-4-pyrrolidino-1,2,3,6-tetrahydropyridine, prepared by refluxing a mixture of 807 grams of 1-benzyl-4-piperidone, 364 grams of pyrrolidine and 5 liters of benzene, there are added with ice cooling 300 grams of methacrolein, and the whole mixture is refluxed for 37 hours, and then concentrated in vacuo to about one third of the initial volume. The white precipitates are collected and crystallized from methanol to give 770 grams of white crystals of 3-benzyl-7-methyl-9-oxo-6-pyrrolidino - 3-azabicyclo[3,3,1]nonane melting at 119° to 121° C.

(6) Methacrolein (45.3 grams) is added with ice cooling to a benzene solution of 1-methyl-4-pyrrolidino-1,2,3,6-tetrahydropyridine, prepared by refluxing a mixture of 58.6 grams of 1-methyl-4-piperidone, 54 grams of pyrrolidine and 300 milliliters of benzene. The whole mixture is treated as in (1) to give 45 grams of 3,7-dimethyl-9-oxo-6-pyrrolidino - 3 - azabicyclo[3,3,1]nonane boiling at 125° to 129° C./0.02 mm. Hg.

(7) 1-benzyl-4-morpholino-1,2,3,6 - tetrahydropyridine (11.5 grams, 0.045 mole) and acrolein (2.5 grams, 0.046 mole) in dioxane (100 milliliters) are treated similarly as in (1) to give 3-benzyl-6-morpholino-9-oxo-3-azabicyclo[3,3,1]nonane (4.1 grams) boiling at 175° to 177° C./0.07 mm. Hg.

In order to further illustrate the present invention, the following examples are given. In these examples, M.P., g. and ml. should be read as "melting point," "gram(s)" and "milliliter(s)."

EXAMPLE 1

Sodium borohydride (0.19 g.) is added to a stirred and ice-cooled solution of 3.1 g. of 3-benzyl-9-oxo-6-piperidino-3-azabicyclo[3,3,1]nonane in 50 ml. of methanol, and the mixture is stirred at room temperature for 3 hours. Then most of the solvent is distilled off under reduced pressure, 25 ml. of water added to the residue, and the aqueous mixture extracted with ethyl acetate. The extract is washed with water and dried over anhydrous sodium sulfate, the solvent distilled off under reduced pressure, and the yellow residue is crystallized from ligroin to give 2.2 g. of 3-benzyl-9-hydroxy-6-piperidino-3-azabicyclo[3,3,1]nonane melting at 123° to 124° C.

*Analysis.*—Calc'd for $C_{20}H_{30}N_2O$ (percent): C, 76.39; H, 9.62; N, 8.91. Found (percent) C, 76.09; H, 9.45; N, 8.93.

EXAMPLE 2

To a stirred and ice-cooled suspension of 0.25 g. of lithium aluminum hydride in 50 ml. of anhydrous ether there is added dropwise a solution of 4.8 g. of 3,7-dimethyl-9-oxo-6-pyrrolidino-3-azabicyclo[3,3,1]nonane in 50 ml. of anhydrous ether. The mixture is stirred at room temperature for about 2 hours, then about 20 ml. of ice water are added to decompose excess of the metal hydride, and about 20 ml. of 10% caustic soda are also added. Two layers result. The ether layer is discarded, and the aqueous layer is extracted with ether. Combined ether extracts are washed with water, dried over anhydrous sodium sulfate, and treated with dry hydrogen chloride gas. The white crystals which form are collected and recrystallized from methanol to give 3.8 g. of 3,7-dimethyl-9-hydroxy-6-pyrrolidino-3-azabicyclo[3,3,1]nonane dihydrochloride melting at 296° to 298° C. (decomposition).

*Analysis.*—Calc'd for $C_{14}H_{26}N_2O \cdot 2HCl$ (percent): C, 54.01; H, 9.06; N, 9.00. Found (percent): C, 53.85; H, 9.24; N, 8.88.

EXAMPLES 3–13

Similar reduction procedure as in Example 1 or 2 gives the following 3-azabicyclo[3,3,1]derivatives from the corresponding oxo compounds:

3-benzyl-9-hydroxy-6-pyrrolidino-3 - azabicyclo[3,3,1] nonane, M.P. 135° to 137° C., 3-benzyl-9-hydroxy-6-(4-methyl - 1 - piperazinyl)-3-azabicyclo[3,3,1]nonane fumarate

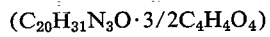

M.P. 194° to 195° C. (decomposition), 3-benzyl-9-hydroxy-7-methyl-6-pyrrolidino - 3 - azabicyclo[3,3,1]nonane dihydrochloride, M.P. 267° to 268° C. (decomposition), 3-benzyl-9-hydroxy-8-methyl-6 - pyrrolidino - 3 - azabicyclo[3,3,1]nonane, M.P. 182° to 184° C., 3-benzyl-9-hydroxy-7-methyl-6 - piperidino - 3 - azabicyclo[3,3,1]nonane dihydrochloride, M.P. 272° to 273° C. (decomposition), 9-hydroxy-3,8-dimethyl-6-pyrrolidino - 3 - azabicyclo-[3,3,1]nonane dihydrochloride, M.P. 255° to 256° C. (decomposition), 9-hydroxy-3-methyl-6-piperidino - 3 - azabicyclo(3,3,1) nonane dihydrochloride, M.P. 235° to 237° C. (decomposition), 9-hydroxy-3,7-dimethyl-6 - piperidino - 3 - azabicyclo-[3,3,1]nonane dihydrochloride, M.P. 282° to 283° C. (decomposition), 9-hydroxy-7-methyl-3-phenethyl-6-pyrrolidino - 3 - azabicyclo[3,3,1]nonane dihydrochloride, M.P. 256° to 259° C. (decomposition), 3-benzyl-9-hydroxy-7-methyl-6-morpholino - 3 - azabicyclo[3,3,1]nonane dihydrochloride containing ½ molecule of water of crystallization, M.P. 235° to 238° C. (decomposition), and 9-hydroxy-3,7-dimethyl-6-morpholino - 3 - azabicyclo-[3,3,1]nonane dihydrochloride containing one molecule of water of crystallization, M.P. 275° to 277° C. (decomposition).

EXAMPLE 14

A 20 ml. solution containing 1.8 g. of 3-benzyl-7-methyl-9-oxo-6-pyrrolidino - 3 - azabicyclo[3,3,1]nonane in anhydrous tetrahydrofurane is added dropwise to a Grignard reagent solution, prepared from 0.26 g. of magnesium, 1.5 g. of bromobenzene and 40 ml. of tetrahydrofurane, with stirring at room temperature, and the resulting mixture is refluxed for 2 hours. Ice-cooled saturated aqueous solution of ammonium chloride is added to the reaction mixture. The magnesium hydroxide precipitate is filtered off, and the aqueous layer is separated from the tetrahydrofurane layer and is extracted with ethyl acetate. The extract and the tetrahydrofurane layer are combined and dried over anhydrous sodium sulfate, then the solvent is distilled off, and the residual pale yellow oil is dissolved in isopropyl ether and treated with dry hydrogen chloride gas. The precipitate is crystallized from a mixture of isopropyl ether and acetone to give 1.9 g. (70.5%) of 3-benzyl-9-hydroxy - 7 - methyl-9-phenyl-6-pyrrolidino-3-azabicyclo[3,3,1]nonane dihydrochloride melting at 185° to 187° C. (decomposition).

Analysis.—Calculated for $C_{26}H_{34}N_2O \cdot 2HCL$ (percent): C, 67.38; H, 7.83; N, 6.05. Found (percent): C, 67.15; H, 8.12; N, 5.81.

EXAMPLE 15

An anhydrous ether solution (80 ml.) containing 7.8 g. of 3-benzyl-7-methyl-9-oxo-6-pyrrolidino-3-azabicyclo [3,3,1]nonane is added dropwise to an ether solution of p-tolyl lithium, prepared from 0.35 g. of lithium, 6.33 g. of p-chlorotoluene and 50 ml. of anhydrous ether, with stirring at room temperature in nitrogen atmosphere, and the resulting mixture is heated under reflux for 2 hours. The reaction mixture is treated as in Example 12 to give 7.25 g. (61.0% yield) of 3-benzyl-9-hydroxy-7-methyl-6-pyrrolidino-9-p-tolyl-3-azabicyclo[3,3,1]-nonane dihydrochloride melting at 200° to 201° C. (decomposition).

Analysis.—Calculated for $C_{27}H_{26}N_2O \cdot 2HCL$ (percent): C, 67.92; H, 8.02; N, 5.87. Found (percent): C, 67.66; H, 8.03; N, 5.97.

EXAMPLES 16–29

Similar procedure as in Example 14 or 15 gives the following azabicyclo-nonane compounds from the corresponding oxo compounds and Grignard reagents or organolithium compounds:

3-benzyl-9-hydroxy - 9 - phenyl - 6 - pyrrolidino-3-azabicyclo[3,3,1]nonane dihydrochloride, M.P. 238° to 239° C. (decomposition).

3-benzyl-9-hydroxy-9-p-methoxyphenyl - 7 - methyl-6-pyrrolidino - 3 - azabicyclo[3,3,1]nonane dihydrochloride, M.P. 140° to 142° C. (decomposition), 3-benzyl - 9 - hydroxy-7-methyl-6-pyrrolidino-9-m-trifluoromethylphenyl - 3 - azabicyclo[3,3,1]nonane dihydrochloride, M.P. 173° to 175° C. (decomposition), 3-benzyl - 9 - hydroxy - 7 - methyl-9-phenyl-6-piperidino-3-azabicyclo[3,3,1]nonane dihydrochloride, M.P. 203° to 206° C. (decomposition), 3-benzyl-9-ethyl - 9 - hydroxy - 7 - methyl-6-pyrrolidino-3-azabicyclo[3,3,1]nonane dihydrochloride, M.P. 247° to 250° C. (decomposition), 9-hydroxy - 7 - methyl - 3 - phenethyl-9-phenyl-6-pyrrolidino-3-azabicyclo[3,3,1]nonane dihydrochloride, M.P. 186° to 188° C. (decomposition), 9-hydroxy - 3 - methyl - 9 - phenyl-6-pyrrolidino-3-azabicyclo[3,3,1]nonane dihydrochloride, M.P. 203° to 204° C. (decomposition), 9-hydroxy - 3,7 - dimethyl - 9 - phenyl-6-pyrrolidino-3-azabicyclo[3,3,1]nonane dihydrochloride, M.P. 241°–243° C. (decomposition).

9-hydroxy - 3,8 - dimethyl-9-phenyl-6-pyrrolidino-3-azabicyclo[3,3,1]nonane dihydrochloride, M.P. 260° to 261° C. (decomposition), 9-hydroxy - 3,7 - dimethyl - 6 - pyrrolidino-9-p-tolyl-3-azabicyclo[3,3,1]nonane dihydrochloride, M.P. 232° to 235° C. (decomposition).

9-hydroxy - 3,7 - dimethyl - 6 - pyrrolidino-9-m-trifluoromethylphenyl-3-azabicyclo[3,3,1]nonane dihydrochloride, M.P. 240° to 242° C. (decomposition), 9-ethyl - 9 - hydroxy - 3,7 - dimethyl-6-pyrrolidino-3-azabicyclo[3,3,1]nonane dihydrochloride, M.P. 270° to 272° C. (decomposition), 9-hydroxy - 3,7 - dimethyl - 9 - phenyl-6-piperidino-3-azabicyclo[3,3,1]nonane dihydrochloride, M.P. 242° to 243° C. (decomposition), and 3-butyl - 9 - hydroxy - 7 - methyl-9-phenyl-6-pyrrolidino-3-azabicyclo[3,3,1]nonane dihydrochloride, M.P. 193° to 194° C. (decomposition).

EXAMPLE 30

To 3 g. of 3-benzyl - 9 - hydroxy - 7 - methyl-6-pyrrolidino-3-azabicyclo[3,3,1]nonane, there are added 20 g. of acetic anhydride and one drop of concentrated sulfuric acid, and the mixture is heated at 90° C. for about 3 minutes, then cooled, diluted with ice water, neutralized with sodium carbonate and extracted with ethyl acetate. The extract layer is washed with water and dried over anhydrous sodium sulfate. The solvent is then distilled off, and the residual oil is dissolved in isopropyl ether, and treated with dry hydrogen chloride gas to give 9-acetoxy-3-benzyl-7-methyl - 6 - pyrrolidino - 3 - azabicyclo[3,3,1]nonane dihydrochloride, which melts, after recrystallization from acetone, at 266° to 267° C. (decomposition). The yield is 3.8 grams.

Analysis.—Calculated for $C_{22}H_{34}N_2O_3 \cdot 2HCl \cdot H_2O$ (percent): C, 59.05; H, 8.11; N, 6.26. Found (percent): C, 59.37; H, 8.02; N, 6.26.

EXAMPLE 31

Methanesulfonyl chloride (1.2 g.) is added to a solution of 3 g. of 3-benzyl-9-hydroxy-7-methyl-6-pyrrolidino-3-azabicyclo[3,3,1]nonane in 30 ml. of pyridine, and the mixture allowed to stand overnight. Then most of the pyridine is distilled off. Ice water is added to the residue. The mixture is saturated with sodium carbonate and then extracted with ethyl acetate. The extract layer is washed with water and dried over anhydrous sodium sulfate. The solvent is distilled off, and the oily residue is dissolved in methylene chloride and treated with dry hydrogen chloride gas. The resulting crystals are recrystallized from methanol to give 2.5 g. of 3-benzyl-7-methyl-9-methylsulfonyloxy-6-pyrrolidino-3-azabicyclo[3,3,1]-nonane dihydrochloride melting at 210° to 212° C. (decomposition).

Analysis.—Calculated for $C_{21}H_{32}N_2SO_3 \cdot 2HCl$ (percent): C, 54.19; H, 7.36; N, 6.02. Found (percent): C, 54.37; H, 7.52; N, 6.03.

EXAMPLE 32

Acetic anhydride (15 ml.) and 20 ml. of pyridine are added to 4 g. of 9-hydroxy-3,7-dimethyl-9-phenyl-6-pyrrolidino-3-azabicyclo[3,3,1]nonane, and the mixture is allowed to stand overnight. Most of the solvent is then distilled off in vacuo, and ice water added to the residue. The mixture is made alkaline with sodium carbonate and extracted with methylene chloride. The extract is washed with water and dried over anhydrous sodium sulfate. The solvent is distilled off, and the residue is crystallized from acetone to give 3.8 g. of 9-acetoxy-3,7-dimethyl-9-phenyl-6-pyrrolidino-3-azabicyclo[3,3,1]nonane melting at 188° to 189° C.

Its dimaleate melts at 147° to 149° C. (decomposition).

Analysis.—Calculated for $C_{22}H_{32}N_2O \cdot 2C_4H_4O_4$ (percent): C, 61.21; H, 6.85; N, 4.76. Found (percent): C, 61.29; H, 6.92; N, 4.69.

EXAMPLE 33

Propionic anhydride (7.8 g.) and 30 ml. of pyridine are added to 7 g. of 3-benzyl-9-hydroxy-6-piperidino-3-azabicyclo[3,3,1]nonane, and the mixture is allowed to stand overnight. Then the reaction mixture is treated as in the preceding example. The oily product is dissolved in ethanol, and a theoretically calculated amount of fumaric acid dissolved in ethanol is added. The precipitate is crystallized from ethanol to give 7.5 g. of 3-benzyl-6-piperidino-9-propionyloxy - 3 - azabicyclo[3,3,1]nonane monofumarate melting at 179° to 181° C. (decomposition).

*Analysis.*—Calculated for $C_{23}H_{24}N_2O_2 \cdot C_4H_4O_4$ (percent): C, 66.64; H, 7.87; N, 5.76. Found (percent): C, 66.39; H, 7.86; N, 5.67.

EXAMPLES 34–44

Similar procedure as in Examples 30–33 gives the following acylated 3-azabicyclo[3,3,1]nonane derivatives from the corresponding 9-hydroxy compounds:

9 - acetoxy - 3 - benzyl - 6 - pyrrolidino - 3 - azabicyclo[3,3,1]nonane monofumarate, M.P. 188° to 190° C. (decomposition), 9 - acetoxy - 3 - benzyl - 7 - methyl - 9 - phenyl-6-pyrrolidino-3-azabicyclo[3,3,1]nonane dihydrochloride, M.P. 120° to 122° C. (decomposition), 9 - acetoxy - 3 - benzyl - 6 - piperidino - 3 - azabicyclo[3,3,1]-nonane monomaleate, M.P. 145° to 147° C. (decomposition), 9 - acetoxy - 7 - methyl - 3 - phenethyl-6-pyrrolidino-3-azabicyclo[3,3,1]nonane dihydrochloride monohydrate, M.P. 245° to 246° C. (decomposition), 9 - acetoxy - 7 - methyl - 3 - phenethyl-9-phenyl-6-pyrrolidino-3-azabicyclo[3,3,1]nonane dimaleate, M.P. 156° to 158° C., 9 - acetoxy - 3,7 - dimethyl - 6 - pyrrolidino-3-azabicyclo[3,3,1]nonane dihydrochloride, M.P. 270° to 272° C., 9 - acetoxy - 3,8 - dimethyl - 9 - phenyl-6-pyrrolidino-3-azabicyclo[3,3,1]nonane, M.P. 148° to 150° C., 9 - acetoxy - 3,7 - dimethyl-6-pyrrolidino-9-p-tolyl-3-azabicyclo[3,3,1]nonane difumarate, M.P. 220° to 222° C. (decomposition), 9 - acetoxy - 9 - p - methoxyphenyl - 3,7 - dimethyl-6-pyrrolidino-3-azabicyclo[3,3,1]nonane difumarate, M.P. 162° to 165° C. (decomposition), 9 - acetoxy - 3,7 - dimethyl - 6 - pyrrolidino-9-m-trifluoromethylphenyl-3-azabicyclo[3,3,1]nonane dimaleate, M.P. 120° to 123° C. (decomposition), and 9 - acetoxy - 9 - ethyl - 3,7 - dimethyl-6-pyrrolidino-3-azabicyclo[3,3,1]nonane difumarate, M.P. 194° to 197° C. (decomposition).

The numbering of the positions according to the present invention is shown as follows:

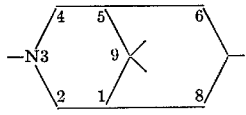

What is claimed is:
1. A compound of the formula

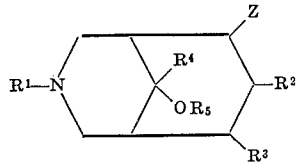

wherein $R^1$ is benzyl, phenethyl or alkyl having 1 to at most 4 carbon atoms, each of $R^2$ and $R^3$ is H or methyl, $R^4$ is H, alkyl having 1 to at most 4 carbon atoms, phenyl, tolyl, methoxyphenyl or trifluoromethylphenyl, $R^5$ is H, alkanoyl having 1 to at most 4 carbon atoms or alkylsulfonyl having 1 to at most 4 carbon atoms, and Z is pyrrolidino, piperidino, morpholino or 4-methyl-1-piperazinyl 2. A pharmaceutically acceptable salt of a compound according to claim 1.

3. A compound according to claim 1 wherein each of $R^4$ and $R^5$ is H.

4. A compound according to claim 1, namely, 3-benzyl-9-hydroxy - 6 - piperidino - 3 - azabicyclo[3,3,1]nonane.

5. A compound according to claim 1, namely 3,7-dimethyl-9 - hydroxy-6-pyrrolidino-3 - azabicyclo[3,3,1]-nonane.

6. A compound according to claim 1, namely 3-benzyl-9-hydroxy-6-pyrrolidino-3-azabicyclo[3,3,1]nonane.

7. A compound according to claim 1, namely 3-benzyl-9-hydroxy - 6 - (4-methyl-1-piperazinyl) - 3 - azabicyclo[3,3,1]nonane.

8. A compound according to claim 1, namely 3-benzyl-9-hydroxy - 7 - methyl - 6 - pyrrolidino - 3 - azabicyclo[3,3,1]nonane.

9. A compound according to claim 1, namely 3-benzyl-9-hydroxy - 8 - methyl - 6 - pyrrolidone - 3 - azabicyclo[3,3,1]-nonane.

10. A compound according to claim 1, namely 3-benzyl - 9 - hydroxy - 7 - methyl - 6 - piperidino - 3 - azabicyclo[3,3,1]-nonane.

11. A compound according to claim 1, namely 9-hydroxy - 3,8 - dimethyl - 6 - pyrrolidino - 3 - azabicyclo[3,3,1]nonane.

12. A compound according to claim 1, namely 9-hydroxy - 3 - methyl - 6 - piperidino - 3 - azabicyclo[3,3,1]nonane.

13. A compound according to claim 1, namely 9-hydroxy - 3,7 - dimethyl - 6 - piperidino - 3 - azabicyclo[3,3,1]nonane.

14. A compound according to claim 1, namely 9-hydroxy - 7 - methyl - 3 - phenethyl - 6 - pyrrolidino - 3 - azabicyclo-[3,3,1]nonane.

15. A compound according to claim 1, namely 3-benzyl - 9 - hydroxy - 7 - methyl - 6 - morpholino - 3 - azabicyclo-[3,3,1]nonane.

16. A compound according to claim 1, namely 9-hydroxy - 3,7 - dimethyl - 6 - morpholino - 3 - azabicyclo[3,3,1]nonane.

17. A compound according to claim 1, namely 3-benzyl - 9 - hydroxy - 7 - methyl - 9 - phenyl - 6 - pyrrolidino-3-azabicyclo[3,3,1]nonane.

18. A compound according to claim 1, namely 3-benzyl - 9 - hydroxy - 7 - methyl - 6 - pyrrolidino-9-p-tolyl-3-azabicyclo[3,3,1]-nonane.

19. A compound according to claim 1, namely 3-benzyl - 9 - hydroxy - 9 - phenyl - 6 - pyrrolidino - 3 - azabicyclo[3,3,1]nonane.

20. A compound according to claim 1, namely 3-benzyl - 9 - hydroxy - 9 - p - methoxyphenyl - 7 - methyl-6-pyrrolidino-3-azabicyclo[3,3,1]nonane.

21. A compound according to claim 1, namely 3-benzyl - 9 - hydroxy - 7 - methyl - 6 - pyrrolidino-9 - m - trifluoromethylphenyl-3-azabicyclo[3,3,1]nonane.

22. A compound according to claim 1, namely 3-benzyl-9-hydroxy-7-methyl-9-phenyl - 6 - piperidino - 3 - azabicyclo[3,3,1]nonane.

23. A compound according to claim 1, namely 3-benzyl - 9 - ethyl - 9 - hydroxy - 7 - methyl-6-pyrrolidino-3-azabicyclo[3,3,1]nonane.

24. A compound according to claim 1, namely 9-hydroxy - 7 - methyl - 3-phenethyl-9phenyl-6-pyrrolidino-3-azabicyclo[3,3,1]nonane.

25. A compound according to claim 1, namely 9-hydroxy - 3 - methyl - 9 - phenyl - 6 - pyrrolidino - 3 - azabicyclo[3,3,1]nonane.

26. A compound according to claim 1, namely 9-hydroxy-3,7-dimethyl-9-phenyl-6 - pyrrolidino - 3 - azabicyclo[3,3,1]nonane.

27. A compound according to claim 1, namely 9-hydroxy - 3,8 - dimethyl - 9 - phenyl-6-pyrrolidino-3-azabicyclo[3,3,1]nonane.

28. A compound according to claim 1, namely 9-hydroxy - 3,7 - dimethyl - 6 - pyrrolidino-9-p-tolyl-3-azabicyclo[3,3,1]nonane.

29. A compound according to claim 1, namely 9-hydroxy-3,7-dimethyl - 6 - pyrrolidino-9-m-trifluoromethylphenyl-3-azabicyclo[3,3,1]-nonane.

30. A compound according to claim 1, namely 9-ethyl-9 - hydroxy - 3,7 - dimethyl-6-pyrrolidino-3 - azabicyclo-[3,3,1]nonane.

31. A compound according to claim 1, namely 9-hydroxy-3,7-dimethyl - 9 - phenyl - 6 - piperidino - 3 - azabicyclo[3,3,1]nonane.

32. A compound according to claim 1, namely 9-butyl - 9 - hydroxy - 7 - methyl - 9 - phenyl - 6 - pyrrolidino-3-azabicyclo[3,3,1]nonane.

33. A compound according to claim 1, namely 9-acetoxy - 3 - benzyl - 7 - methyl - 6 - pyrrolidino - 3-azabicyclo[3,3,1]nonane.

34. A compound according to claim 1, namely 3-benzyl - 7 - methyl - 9 - methylsulfonyloxy - 6 - pyrrolidino-3-azabicyclo[3,3,1]nonane.

35. A compound according to claim 1, namely 9-acetoxy - 3,7 - dimethyl - 9 - phenyl - 6 - pyrrolidino-3-azabicyclo[3,3,1]nonane.

36. A compound according to claim 1, namely 3-benzyl - 6 - piperidino - 9 - propionyloxy - 3 - azabicyclo-[3,3,1]nonane.

37. A compound according to claim 1, namely 9-acetoxy - 3 - benzyl - 6 - pyrrolidino - 3 - azabicyclo-[3,3,1]nonane.

38. A compound according to claim 1, namely 9-acetoxy - 3 - benzyl - 7 - methyl-9-phenyl-6-pyrrolidino-3-azabicyclo[3,3,1]nonane.

39. A compound according to claim 1, namely 9-acetoxy - 3 - benzyl - 6 - piperidino - 3 - azabicyclo-[3,3,1]nonane.

40. A compound according to claim 1, namely 9-acetoxy - 7 - methyl - 3 - phenethyl - 6 - pyrrolidino - 3-azabicyclo[3,3,1]nonane.

41. A compound according to claim 1, namely 9-acetoxy - 7 - methyl - 3 - phenethyl - 9 - phenyl - 6 - pyrrolidino-3-azabicyclo[3,3,1]nonane.

42. A compound according to claim 1, namely 9-acetoxy - 3,7 - dimethyl - 6 - pyrrolidino - 3 - azabicyclo-[3,3,1]nonane.

43. A compound according to claim 1, namely 9-acetoxy - 3,8 - dimethyl - 9 - phenyl - 6 - pyrrolidino-3-azabicyclo[3,3,1]nonane.

44. A compound according to claim 1, namely 9-acetoxy - 3,7 - dimethyl - 6 - pyrrolidino-6-p-tolyl-3-azabicyclo[3,3,1]nonane.

45. A compound according to claim 1, namely 9-acetoxy 9 - p - methoxyphenyl - 3,7 - dimethyl - 6 - pyrrolidino-3-azabicyclo[3,3,1]nonane.

46. A compound according to claim 1, namely 9-acetoxy - 3,7 - dimethyl - 6 - pyrrolidino-9-m-trifluoromethylphenyl-3-azabicyclo[3,3,1]nonane.

47. A compound according to claim 1, namely 9-acetoxy - 9 - ethyl - 3,7 - dimethyl - 6 - pyrrolidino - 3-azabicyclo[3,3,1]nonane.

References Cited

UNITED STATES PATENTS 3,167,562  1/1965  Iwai et al. _____ 260—294.7

ALEX MAZEL, Primary Examiner

A. M. T. TIGHE, Assistant Examiner

U.S. Cl. X.R.

260—247.1, 247.2, 268, 293.4, 294.3, 294.7, 296; 424—248, 250, 267